US009519668B2

(12) United States Patent
Kaldewey et al.

(10) Patent No.: US 9,519,668 B2
(45) Date of Patent: Dec. 13, 2016

(54) LOCK-FREE CREATION OF HASH TABLES IN PARALLEL

(71) Applicant: International Business Machines Corporation, Armonk, NY (US)

(72) Inventors: Tim Kaldewey, San Jose, CA (US); Guy M. Lohman, San Jose, CA (US); Peter B. Volk, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 656 days.

(21) Appl. No.: 13/887,422

(22) Filed: May 6, 2013

(65) Prior Publication Data

US 2014/0330801 A1 Nov. 6, 2014

(51) Int. Cl.
*G06F 17/30* (2006.01)
(52) U.S. Cl.
CPC .................................. *G06F 17/3033* (2013.01)
(58) Field of Classification Search
CPC .................................................. G06F 17/3033
See application file for complete search history.

(56) References Cited

U.S. PATENT DOCUMENTS

| 6,823,351 B1* | 11/2004 | Flood | G06F 12/0276 |
| 2010/0030995 A1* | 2/2010 | Wang | G06F 17/30339 711/173 |
| 2010/0185703 A1* | 7/2010 | Ylonen | G06F 12/0269 707/816 |
| 2011/0252033 A1* | 10/2011 | Narang | G06F 17/30628 707/737 |
| 2012/0011133 A1 | 1/2012 | Faerber et al. | |
| 2012/0011144 A1 | 1/2012 | Transier et al. | |
| 2012/0036134 A1* | 2/2012 | Malakhov | G06F 9/5016 707/747 |
| 2014/0129783 A1* | 5/2014 | Marathe | G06F 9/38 711/147 |
| 2014/0173258 A1* | 6/2014 | Fahs | G06F 9/3887 712/225 |
| 2014/0250142 A1* | 9/2014 | Pradhan | G06F 17/3033 707/765 |

OTHER PUBLICATIONS

K. Bratbergsengen; "Hashing Methods and Relational Algebra Operations," Procs. of the Tenth International Conf. on Very Large Data Bases (Aug. 1984), 323-333.

(Continued)

*Primary Examiner* — Kris Mackes
(74) *Attorney, Agent, or Firm* — Cantor Colburn LLP; Bryan Butler

(57) ABSTRACT

A hash table is created in parallel without requiring a lock or random accesses to memory. The hash table of a database system is logically partitioned and a separate thread is assigned to each partition of the hash table. As many separate threads as can fit their corresponding hash table partitions into the processor's cache are executed in parallel with other threads without a lock. Execution of a number of separate threads includes: scanning an input data table for a thread's partition and applying a hash function to each key, inserting data of keys that hash to the thread's partition into the thread's partition, and ignoring keys that do not hash to the thread's partition.

13 Claims, 4 Drawing Sheets

(56) References Cited

OTHER PUBLICATIONS

DeWitt et al., "Multiprocessor Hash-Based Join Algorithms;" Procs. of the Eleventh International Conf. on Very Large Data Bases (Aug. 1985); 23 pages.
Specifications, [online]; [retrieved on May 3, 2013]; retrieved from the Internethttp://www.geforce.com/Hardware/GPUs/geforce-gtx-580/specifications; 2 pages.
T. Kaldewey et al.; Memory Matters; Work in Progress Session in the 29th IEEE Real-Time Systems Symposium (RTSS'08). Barcelona, Spain, 2008; 4 pages.
C. Kim et al.; "Sort vs. Hash Revisited: Fast Join Implementation on Modern Multi-Core CPUs" 35th International Conference on Very Large Databases (VLDB'09). Lyon, France, 2009; 12 pages.
T. J. Lehman et al.; "Query Processing in Main Memory Database Management Systems;" Procs. of the ACM SIGMOD Conf. on Management of Data (1986); 15 pages.
Lu et al.; "Some Experimental Results on Distributed Join Algorithms in a Local Network." Procs. of the Tenth International Conf. on Very Large Data Bases (Aug. 1984), 292-304.
IBM, "Method to decide on teh best partitioning columns and best range cvaules for creating the tange partition tables", IP.com Oct. 29, 2010, pp. 1-7.
IBM, "Method for Detaching a Partition Online from a Range Partitioned Table", IP.com, published Sep. 6, 2011, pp. 1-6.
Laarman, Alfons, et al. "Boosting Multi-Core Reachability Performance with Shared Hash Tables", 2010, pp. 1-9.
Saad, RT. et al., "Mixed Shared-distributed Hash Tables Approaches for Parallel State Space Construction", 2011 10th International Symposium on Parallel and Distributed Computing, IEEE, pp. 9-16.
Qiao et al; Main-memory scan sharing for multi-core CPUs. 34th International Conference on Very Large Databases (VLDB•08), Auckland, New Zealand, 2008.
M. S. Sasso et al; "Fragmentation: A Technique for Efficient Query Processing;" ACM Transactions on Database Systems 11, 2 (Jun. 1986), 113-133.
P. Valduriez et al.; "Join and Semijoin Algorithms for a Multiprocessor Database Machine;" ACM Transactions on Database System 9, 1 (Mar. 1984), 133-161.

\* cited by examiner

LOCK-FREE CREATION OF HASH TABLES IN PARALLEL

BACKGROUND

The present invention relates to creating hash tables, and more specifically, to creating lock-free hash tables in parallel.

The performance of many database queries, and in particular more complex ones that require combining results from multiple tables, typically depends on the efficiency of the relational join operator. For queries referencing more than a few rows, an efficient join method is a hash join. Each value of the join column is hashed by a hash function to a value that indexes a bucket (entry) in the hash table. A typical hash join first builds hash tables for one or more smaller tables, usually smaller tables whose contents more readily fit into memory, against which it then probes the rows of the larger table using a different equality join predicate for each table probed. If the join predicate is true, the qualifying rows are added to a result set. The hash function may introduce collisions, in which two distinct values of the same join column may hash to the same bucket of the hash table.

Commodity, multi-core systems typically parallelize the creation and probing of hash tables in an effort to improve join performance. Probing an in-memory hash table in parallel does not require any locking or latching, as it requires read-only access. However, building a hash table in parallel typically results in concurrent write access to the hash table, which requires a lock for synchronization. Locking a memory region for exclusive access is a time-consuming operation, particularly in the presence of concurrent access to the same region by other insert operations that have to wait for write access.

SUMMARY

According to an embodiment, a method, database system and computer program product are provided for creating a hash table in parallel without requiring a lock or random accesses to memory. The hash table of a database system is partitioned and a separate thread is assigned to each partition of the hash table. A number of separate threads execute in parallel with other threads without a lock. The execution of a number of separate threads includes: scanning an input data table for a thread's partition and applying a hash function to each key, inserting data of keys that hash to the thread's partition into the thread's partition, and ignoring keys that do not hash to the thread's partition.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein drive hashing from the perspective of a hash table and not from an input table. Particularly, embodiments partition the hash table instead of partitioning the input table. The input table is sequentially scanned once for each hash table partition in parallel using a separate thread for each hash table partition. Accordingly, exemplary embodiments execute each separate thread in parallel for each hash table partition without requiring a lock or random accesses to memory.

Figure 1:
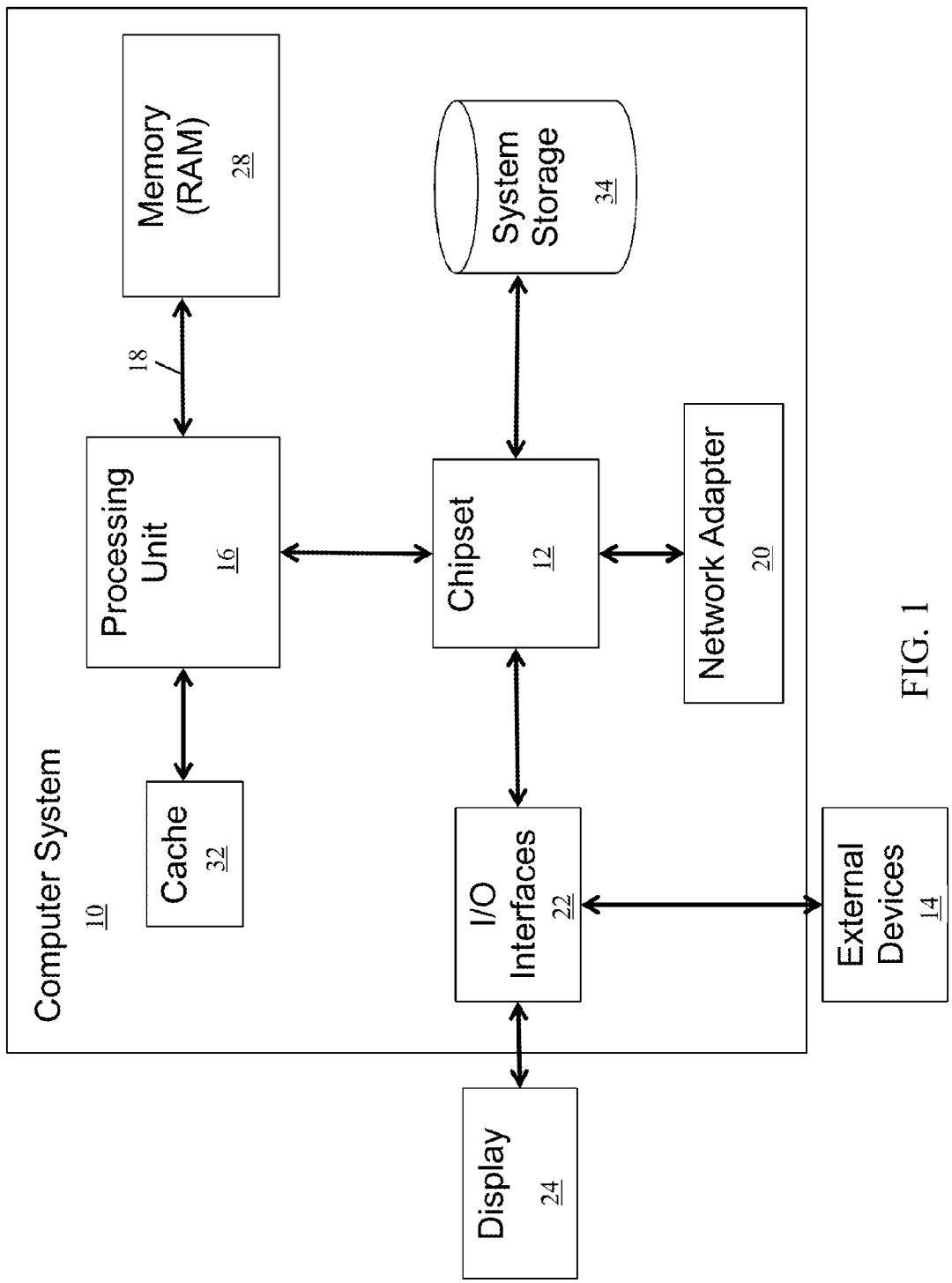
FIG. 1 depicts a diagrammatic representation of the creation of a hash table in parallel according to the contemporary art.

Referring now to FIG. 1, a block diagram of a computer system 10 suitable for creating lock-free hash tables in parallel according to exemplary embodiments is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Special-purpose computer systems include hardware accelerators such as FPGAs (Field-Programmable Gate Arrays), GPUs (Graphics Processing Units), and similar systems, which may be used in lieu of or in addition to general-purpose processors.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a general-purpose computing device, also referred to as a processing device. The components of computer system may include, but are not limited to, one or more processors or processing units 16, a system memory 28, and a bus 18 that couples various system components including system memory 28 to processor 16. Computer system 10 includes a chipset 12 to manage the data flow between the processor 16, memory 28 and external devices 14.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM). Computer system may also include cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

In contemporary disk-based systems, input data tables that do not fit in memory (RAM) are partitioned to minimize the number of times that data are accessed and to perform mostly sequential reads and writes to disk, because multiple scans of the input data and/or random accesses to the data stored on disk are cost prohibitive. However, even when the sequential bandwidth of an individual disk reaches approximately 200 MB/s, the bandwidth is reduced by orders of magnitude because access in parallel by multiple processes usually requires random accesses that move the disk arm when switching processes.

The growth of main memory capacities has made main-memory-resident database systems more cost-effective. Contemporary main-memory database systems help alleviate disk-based input/output (I/O) bottlenecks, but run into other bottlenecks. Even when all the requisite information for performing a hash join is already in memory, hash table building and probing, which both require random memory accesses, are the slowest and most costly operations. Random memory accesses cause cache and, if used, translation look-aside buffer (TLB) misses, which on contemporary processors incur latencies of up to 300 and 1000 compute cycles, respectively. Data stored in main memory can be accessed by parallel processes and/or threads simultaneously. In fact, memory bandwidth of contemporary multi-core architectures may peak at nearly 200 GB/s when accessed via parallel scans. Probing an in-memory hash table in parallel does not require any locking or latching, as it requires read-only access. However, building a hash table in parallel using the present state of the art results in concurrent write access to the hash table, which requires some form of synchronization.

Figure 2:
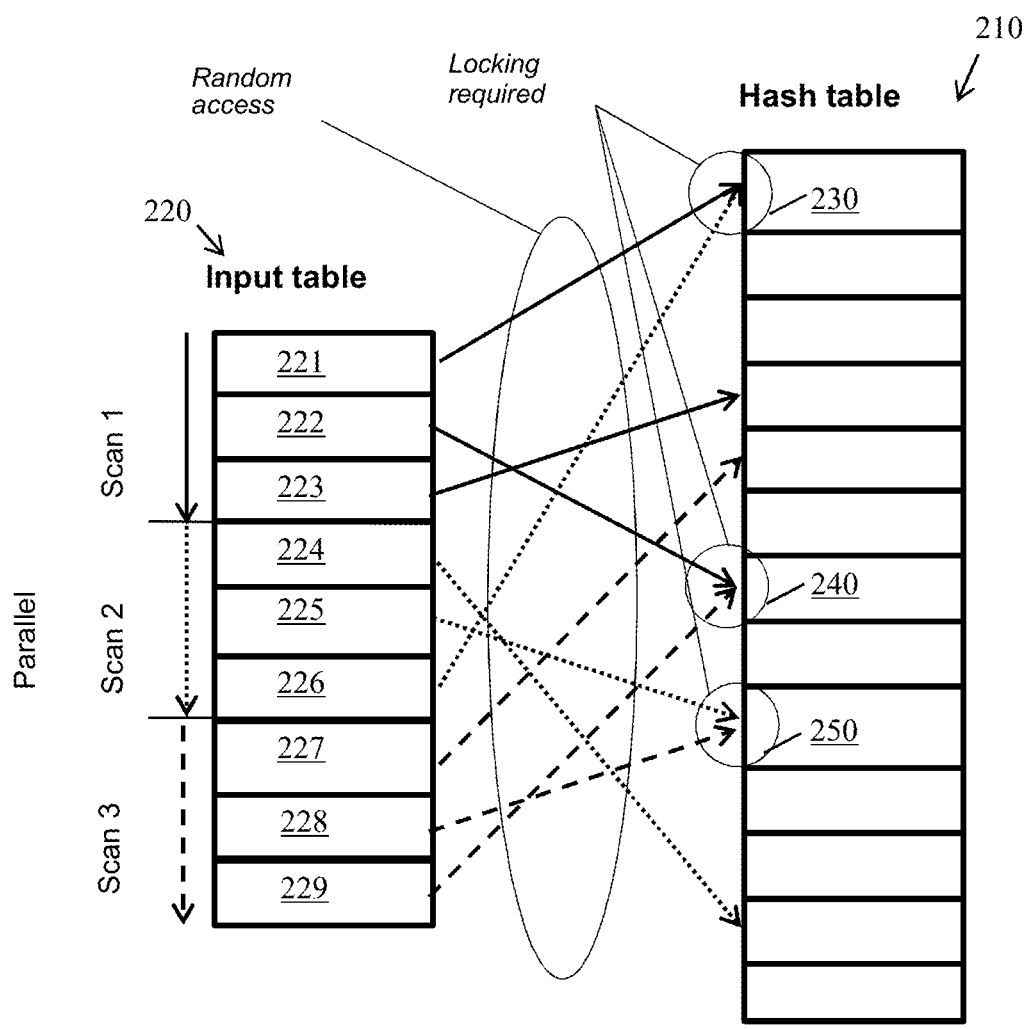
FIG. 2 depicts a diagrammatic representation of the creation of a hash table in parallel according to the contemporary art.

FIG. 2 depicts a diagrammatic representation of the creation of a hash table 210 in parallel according to the contemporary art. As shown in FIG. 2, each partition—e.g., rows 221-223, 224-226, 227-229—of input table 220 is scanned in parallel and tuples are randomly inserted into the hash table 210. The location of the insert position is based on a hash value computed from the input tuple, specifically its primary key. Exclusive access to a location in the hash table 210 where a tuple is inserted is typically enforced by a latch or lock synchronization mechanism to prevent simultaneous updates to the same hash bucket by different threads 230, 240, 250 as shown in FIG. 2, that cause results written by one thread to be erroneously overwritten by the other. Locking a memory region of the hash table 210 for exclusive access is a time-consuming operation, particularly in the presence of concurrent access to the same region by other insert operations that have to wait for write access.

One method for minimizing locking while creating a hash table in parallel relies on partitioning the input data and having each parallel process build a separate "local" hash table for its individual partition. However, locking is eventually required to combine these individual hash tables, unless each probe is executed against all local hash tables. For hash tables that fit into the processor cache, this might be a viable alternative, but otherwise the cost of repeated random memory accesses will outweigh the cost of synchronization required to create a single hash table.

Another method for minimizing locking while creating a hash table in parallel relies on partitioning both input tables to a join, such that each sub-table only needs to be joined with one other sub-table without requiring a cross product of all sub-tables. Because the data are already in memory, the tables are partitioned based upon their hash prefix. This allows the actual join to be executed in parallel without any further synchronization because the hash tables are created per sub-table, and probing is limited to sub-tables that share the same hash prefix. As a result no locking is required, even when inserting data in parallel into sub-tables.

However, this method requires two scans of each table or intermediate result to be joined, one scan for partitioning the rows and one scan for the actual join. The size of a sub-table is usually chosen such that it fits into the processor cache to speed up subsequent operations. Given the relatively small size of processor caches, large input tables produce a significant number of sub-tables. This in turn results in many distinct memory references, which cause cache and TLB misses during partitioning. Multi-phase partitioning may help to limit the number of distinct memory references, but requires additional scans of the input data. Even though this method yields an acceptable hash join performance, its partitioning phase is a bottleneck. During the partitioning phase, this method still requires some locking, and random memory accesses cannot be avoided. Locking is required when aggregating histograms, and using hash prefixes to partition a data set results in random memory accesses while moving data to target locations computed by the hash prefix. Moreover, with growing input table size, this method requires multiple partitioning passes, each of which requires scanning all input data and writing them to new, random locations.

Figure 3:
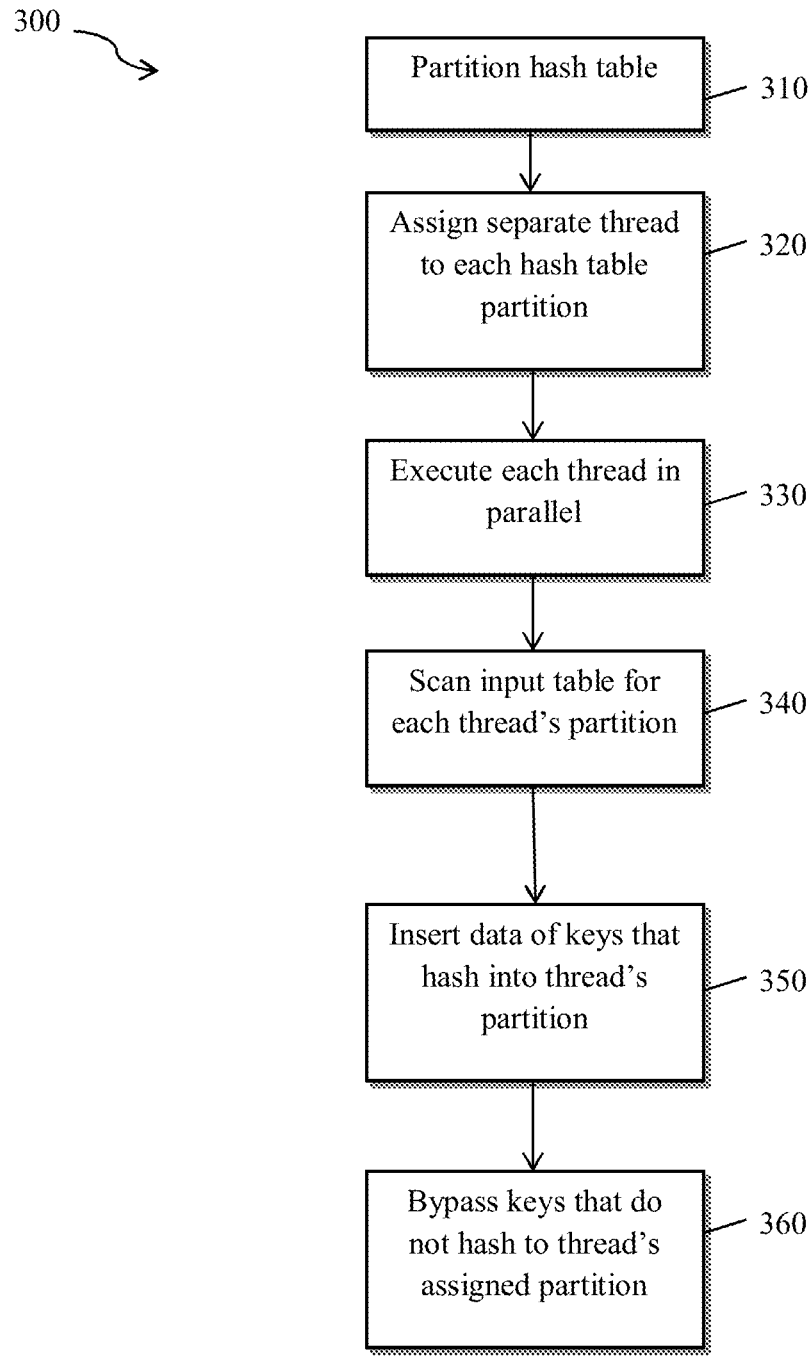
FIG. 3 depicts a flow chart of a lock-free creation of a hash table in parallel according to an embodiment.
Figure 4:
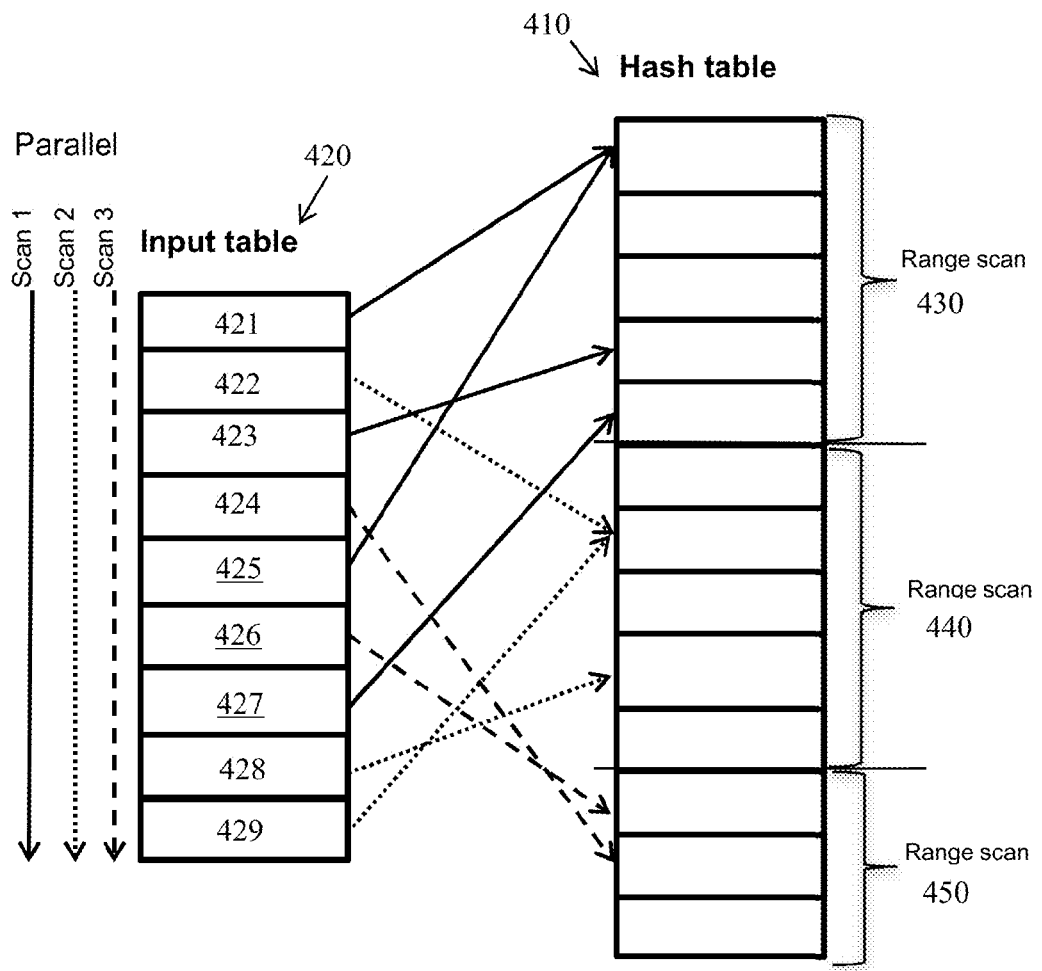
FIG. 4 depicts a diagrammatic representation of a lock-free creation of a hash table in parallel according to an embodiment.

With reference to FIGS. 3 and 4, an embodiment for creating a lock-free, hash table 410 in parallel is shown. The processing unit 16 of FIG. 1 drives hashing and creation of a hash table 410 from the perspective of a hash table and not from an input data table 420 according to an embodiment. In other words, an embodiment makes the hash table 410 an active object in the creation of the hash table 410, instead of a passive one as in previous approaches.

In block 310, a hash table 410 is partitioned such that each hash table partition 430, 440, 450 fits into a processor cache according to an embodiment. A hash table partition size that fits into the processor's cache minimizes main memory accesses during hash table creation. In block 320, a separate thread is assigned to each partition 430, 440, 450 of the hash table 410. Accordingly, only the single thread assigned to a particular hash table partition can write to or modify hash buckets within that particular hash table partition. As a result, a thread can progress independently of other threads without any need for synchronization.

In block 330, each separate thread executes in parallel to create its partition of the hash table 410. In an embodiment, the execution of a thread includes scanning each row 421, 422, 423, 424, 425, 426, 427, 428, 429 of the input table 420 and applying the hash function to each key as shown in block 340. If the hash result falls into that thread's hash partition, the key-data pair (e.g., a row, a row ID, or any value associated with the key) is inserted into the hash partition assigned to the thread as shown in block 350. For example, the hash result of input table rows 421, 423, 425, 427 fall into hash table partition 430, the hash result of input table rows 422, 428, 429 fall into hash table partition 440, and the hash result of input table rows 424, 426 falls into hash table partition 450, as shown in detail in FIG. 4.

The input table 420 is scanned once for each hash table partition in parallel. This embodiment requires scanning the input table 420 as many times as there are hash table partitions 430, 440, 450. However, because the scanning can be done in parallel by multiple threads, no requirement to lock for synchronization or to access memory via random accesses will be necessary.

In block 360, embodiments simply ignore and bypass rows which contain keys that do not hash to a particular thread's assigned hash partition, because another thread assigned to another hash partition of the hash table 410 will take care of inserting those keys. Paying the cost of multiple passes over the input data table 420 avoids locking the entire hash table 410 or a row of the hash table for inserts, as only one thread is responsible for each hash table partition 430, 440, 450.

There are multiple reasons why scanning the input data table 420 over and over is advantageous. First, sequential or streaming access to data stored in main memory or in secondary storage is known to be significantly faster than random access by more than an order of magnitude. Second, in multi-core architectures, a single thread cannot saturate memory bandwidth. Multiple threads are necessary to achieve optimal memory performance. Third, scans can be shared by multiple threads according to an embodiment. Once the thread has completed its scan of the input data table 420, addresses of that thread's hash table partition will no longer be referenced and can be flushed to main memory. It should be noted that the total number of threads that are active concurrently can be significantly lower than the number of hash table partitions.

Performance is governed by how fast the input table can be scanned by each thread, and how fast the hash table partitions can be flushed or written back to main memory. The resulting memory access patterns and parallel sequential reads and writes may be optimal for modern processors.

Accordingly, each thread can be executed independently and requires no synchronization with other tasks according to disclosed embodiments herein. Moreover, the scanning of input data results in strictly sequential memory accesses, and choosing a partition size less than or equal to the processor cache avoids cache and TLB misses for inserting tuples into the appropriate hash table partition.

The disclosed embodiments herein employ "embarrassingly parallel" computing in that there is no dependency or synchronization between parallel threads, and as such, embodiments are well matched to multi-core architectures. Modern processor architectures require parallel memory access from all cores in order to achieve maximum memory performance. As there is no synchronization required between threads in the embodiments disclosed, all threads will be active continuously, as many as required to saturate memory bandwidth of the target architecture.

Hashing is known to raise the problem of collisions, in which more than one distinct key hashes to the same location in the hash table. Embodiments provide resolution protocols to collisions via chaining and open addressing. Chaining generates an overflow bucket to store the additional colliding key, and links it to all other colliding keys for that hash bucket. On the other hand, open addressing looks sequentially for the next available slot in the hash table.

For both chaining and open addressing, a correct partition size is selected to avoid random memory access due to cache and/or TLB misses. Moreover, implementing chaining requires careful engineering to avoid an excessive number of distinct memory references that can cause cache and TLB misses. Open addressing needs to address the case when there are no remaining slots in a partition. For example, to demonstrate the effects of partition size, consider a processor with 64 TLB entries and an operating system with 4 KB memory pages. In this case, only memory addresses within 64 distinct 4 KB pages can be accessed before encountering TLB misses. On contemporary processors, this is more likely to be the limiting factor than their several megabytes of cache.

Chained hashing grows the partition size in the presence of collisions. Therefore, the partition size must be limited to the 64 buckets (i.e., the number of TLB entries), each with a maximum size of 4 KB, which is equal to the page size. To avoid the cache and TLB misses that are caused by following the pointers formed by the chained buckets, an embodiment creates an index for currently active buckets, that is, buckets that have space. As a result, full buckets or pages are no longer referenced and will get flushed to main memory automatically over time.

For open addressing, the size of each hash table partition should not exceed 256 KB, which is the number of TLB entries times the page size, to limit the cost of potentially scanning the entire partition to locate an unoccupied slot in case of a collision.

For open addressing, a problem may arise when a collision occurs and the search for a free slot reaches the end of a partition. Simply continuing the search at the beginning of the partition requires storing each partition boundary and probing the hash table in exactly the same way and not allowing for linear scans for matching keys. Moreover, this does not cover the case when a partition is completely full. Inserting data directly into the next partition requires coordination with the task handling that partition (i.e., locking).

Accordingly, an embodiment stores data in separate overflow buckets that are processed after a thread has finished scanning the input table. In other words, data that does not fit into a particular hash table partition is passed to another thread with an overflow bucket. Another embodiment provides an input queue for each hash table partition, to which the task processing the preceding partition can add overflow data using an atomic add.

Technical effects and benefits of the disclosed embodiments include improved performance for the creation of hash tables by eliminating any requirement to lock for synchronization or to access memory via random accesses (e.g., cache and TLB misses).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of lock-free creation of partitioned hash tables in parallel for an input data table, comprising:
   partitioning a hash table of a database system;
   assigning a separate thread to each partition of the hash table; and
   executing a number of the separate threads in parallel with other threads without a lock, the executing comprising for each of said number:
      scanning the input data table and applying a hash function to each key in the input data table; and
      in response to the scanning:
         inserting data of keys that hash to the thread's partition into the thread's partition of the hash table; and
         ignoring keys that do not hash to the thread's partition,
   wherein an index is created for active buckets of the partition such that inactive buckets of the partition are no longer referenced and are automatically flushed to main memory, and
   wherein overflow data, in the partition, are stored in separate overflow buckets to be processed by another thread.

2. The method of claim 1, wherein the scanning of the input data table results in strictly sequential memory accesses.

3. The method of claim 1, wherein the contents of the thread's partition are flushed to main memory in response to completing the executed thread.

4. The method of claim 1, wherein each partition size is less than or equal to a cache size of the processing device.

5. The method of claim 1, wherein an input queue is provided for each partition, enabling a thread processing of a preceding partition to add overflow data to a subsequent input queue.

6. A database system of lock-free creation of partitioned hash tables in parallel, comprising:
   a memory having computer readable instructions; and a processor for executing the computer readable instructions, the instructions comprising:
      partitioning a hash table of a database system;
      assigning a separate thread to each partition of the hash table; and
      executing a number of the separate threads in parallel with other threads without a lock, the executing comprising for each of said number:
         scanning an input data table and applying a hash function to each key in the input data table; and
         in response to the scanning:
            inserting data of keys that hash to the thread's partition into the thread's partition of the hash table; and
            ignoring keys that do not hash to the thread's partition,
      wherein an index is created for active buckets of the partition such that inactive buckets of the partition are no longer referenced and are automatically flushed to main memory, and
      wherein overflow data, in the partition, are stored in separate overflow buckets to be processed by another thread.

7. The database system of claim 6, wherein the scanning of the input data table results in strictly sequential memory accesses.

8. The database system of claim 6, wherein contents of the thread's partition are flushed to main memory in response to completing the executed thread.

9. The database system of claim 6, wherein each partition size is less than or equal to a cache size of the processor.

10. The database system of claim 6, wherein an input queue is provided for each partition, enabling a thread processing of a preceding partition to add overflow data to a subsequent input queue.

11. A computer program product for lock-free creation of partitioned hash tables in parallel for an input data table, the computer program product comprising a non-transitory computer readable storage medium having program code embodied therewith, the program code executable by a processor to:

partition a hash table of a database system;

assign a separate thread to each partition of the hash table; and execute a number of the separate threads in parallel with other threads without a lock, the executing comprising for each of said number:

scanning the input data table and applying a hash function to each key in the input data table; and in response to the scanning:

inserting data of keys that hash to the thread's partition into the thread's partition of the hash table; and ignoring keys that do not hash to the thread's partition, wherein an index is created for active buckets of the partition such that inactive buckets of the partition are no longer referenced and are automatically flushed to main memory, and wherein overflow data, in the partition, are stored in separate overflow buckets to be processed by another thread.

12. The computer program product of claim 11, wherein the scanning of the input data table results in strictly sequential memory accesses.

13. The computer program product of claim 11, wherein the contents of the thread's partition are flushed to main memory in response to completing the executed thread.

\* \* \* \* \*